United States Patent Office 3,275,554
Patented Sept. 27, 1966

3,275,554
POLYOLEFIN SUBSTITUTED POLYAMINES AND LUBRICANTS CONTAINING THEM
Adriaan Hendrik Wagenaar, Amsterdam, Netherlands, assignor to Shell Oil Company, New York, N.Y., a corporation of Delaware
No Drawing. Filed Mar. 17, 1964, Ser. No. 352,677
Claims priority, application Netherlands, Aug. 2, 1963, 296,139
6 Claims. (Cl. 252—50)

This invention relates to non-ash forming lubricants which are highly detergent and which are particularly useful in engines operating under "stop and go" conditions and the non-ash forming detergent polymer therefor.

It is known that long chain alkyl aminoamines having from 6–24 carbon atoms in the alkyl chain impart stabilizing properties when added to lubricating oils. Also, polyvinyl chloride polymers or copolymers when reacted with such monoamines improve the pour point and viscosity index of mineral lubricating oils. However, these monoamines and their reaction products do not possess detergent, corrosion or wear inhibiting properties and therefore they fail to keep engines clean and in good operating condition particularly under the severe "stop and go" driving conditions.

It has now been discovered that detergency, as well as corrosion and wear inhibition can be imparted to lubricating oil compositions by addition thereto of a minor amount of from about 0.1% to about 20%, preferably from about 0.2% to about 10% by weight of an oil-soluble aliphatic polyamine containing at least one olefinic polymer chain having a molecular weight in the range of from about 700 to about 100,000 preferably from about 1200 to about 50,000 and which may be saturated or unsaturated and straight or branch chain and attached to nitrogen and/or carbon atoms of the alkylene radicals connecting the amino-nitrogens and which may be represented by the formula:

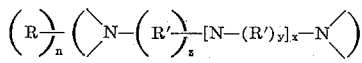

where R is an olefinic polymer radical in the molecular weight range given above, and can be attached to the N carbon(s) and/or to the C carbons of the alkylene radicals R' which contain from 1 to 8, preferably 1 to 4 carbon atoms, $n$ is an integer of at least 1 and preferably from 1 to 4, $x$, $y$, and $z$ are integers such that $z$ is at least 1 and $x$ and $y$ may be zero or integers of 1 and higher. Preferred is when the polymer chain R is a branch-chain olefin polymer in the molecular weight range of 1200 to 50,000 and attached to a terminal nitrogen and $n$ is between 1 and 2.

The olefinic polymers (R) which are reacted with polyamines to form the additive of the present invention include olefinic polymers derived from alkanes or alkenes with straight or branched chains, which may or may not have aromatic or cycloaliphatic substituents, for instance, groups derived from polymers or copolymers of olefins which may or may not have a double bond.

Examples of non-substituted alkenyl and alkyl groups are polyethylene groups, polypropylene groups, polybutylene, polyisobutylene groups, polyethylene, polypropylene groups, polyethylene poly-alpha-methyl styrene groups and the corresponding groups without double bonds.

The polyamines used to form the detergent polymer of this invention include primary and secondary aliphatic polyamines such as ethylene diamine, diethylene triamine, triethylene tetramine, diamine, propylene diamine, butylene diamine, trimethyl trimethylene diamine, tetramethylene diamine, diaminopentane or pentamethylene diamine, diaminohexane, hexamethylene diamine, heptamethylene diamine, diaminooctane, decamethylene diamine, and the higher homologues up to 18 carbon atoms. In the preparation of these polymers the same amines can be used or substituted amines can be used such as N-methyl ethylene diamine,
N-ethylethylene diamine,
N-propyl ethylene diamine,
N-2-hydroxypropyl ethylene diamine,
penta-(1-methylpropylene)hexamine;
tetrabutylene-pentamine;
hexa-(1,1-dimethylethylene)heptamine;
di-(1-methylbutylene)-triamine; pentaamylenehexamine;
tri-(1,2,2-trimethylethylene)tetramine;
di-(1-methylamylene)-triamine;
tetra-(1,3-dimethylpropylene)pentamine;
penta-(1,5-dimethylamylene)hexamine;
di(1-methyl-4-ethylbutylene)triamine;
penta-(1,2-dimethyl-1-isopropylethylene)hexamine;
tetraoctylenepentamine
and the like.

Compounds possessing triamine as well as tetramine and pentamine groups are appreciated for use because these can be prepared from technical mixtures of polyethylenepolyamines, which offers economic advantages.

The polyamine from which the polyamine groups may have been derived may also be a cyclic polyamine, for instance, the cyclic polyamines formed when aliphatic polyamines with nitrogen atoms separated by ethylene groups were heated in the presence of hydrogen chloride.

An example of a suitable process for the preparation of the compounds according to the invention is the reaction of a halogenated hydrocarbon having at least two halogen atoms as substituents and a hydrocarbon chain as defined hereinbefore with a polyamine. The halogen atoms are replaced by a polyamine group, while hydrogen halide is formed. The hydrogen halide can then be removed in any suitable way, for instance, as a salt with excess polyamine. The reaction between halogenated hydrocarbon and polyamine is preferably effected at elevated temperature in the presence of a solvent, in particular a solvent having a boiling point of at least 160° C.

The reaction between polyhydrocarbon halide and a polyamine having more than one nitrogen atom available for this reaction is preferably effected in such a way that cross-linking is reduced to a minimum, for instance, by applying an excess of polyamine.

The additives according to the invention may be prepared, for instance, by alkylation of aliphatic polyamines. For instance a polyamine is reacted with an alkyl or alkenyl halide. The formation of the alkylated polyamine is accompanied by the formation of hydrogen halide, which is removed, for instance, as a salt of starting polyamine present in excess. With this reaction between alkyl or alkenyl halide and the strongly basic polyamines dehalogenation of the alkyl or alkenyl halide may occur as a side reaction, so that hydrocarbons are formed as by-products. Their removal may, without objection, be omitted.

A particularly elegant embodiment of the process starts from an alkene with a terminal double bond whose beta carbon atoms carries a methyl group. Chlorination with a theoretical quantity of chlorine results in alpha-polyisobutyl allyl chloride and beta-polyisobutyl methyallyl chloride, while hydrochloric acid is split off. At the same time, side reactions produce a quantity of dichloro compound. With the chlorination product obtained in this way the polyamine is alkylated to alkenylpolyamine. The starting material is, for instance, polyisobutylene, which is treated with the theoretical quantity of chlorine in an inert solvent at room temperature, and the resulting polyisobutenyl chloride is converted with tetraethylenepentamine into monoisobutenyltetraethylenepentamine or diisobutenyltetraethylenepentamine.

The invention will now be elucidated with the aid of the following example.

EXAMPLE I.—PREPARATION OF POLYISOBUTENYLTETRAETHYLENEPENTAMINE (a) Polyisobutylene with a mol wt. of 1250 was dissolved in carbon tetrachloride to a concentration of 40% wt. After addition of an iodine crystal chlorine was passed in at room temperature until the color of the solution faded. Subsequently, the solvent was evaporated in vacuo, the hydrogen chloride gas formed being removed at the same time. The residue contained 4.2% wt. chlorine.

(b) The polyisobutenyl chloride obtained according to (a) was heated with tetraethylenepentamine (four-fold excess) at 180° C. for 6 hours, while being stirred. After having cooled down the product was taken up in pentamine and washed with water until chlorine-free. The reaction product was isolated by evaporation of the solvent. The residue obtained contained 2.5% wt. nitrogen and 0.23% wt. chlorine.

Other examples of additives of the present invention prepared by the method of Example I are: (II) polyisobutenyl diethylene triamine, (III) polyisobutenyl triethylene tetramine, (IV) polyisobutenylpolyethylene tetraethylene pentamine, (V) polyethylene polypropylene tetraethylene pentamine, (VI) polyethylene poly-alpha-methyl styrene tetraethylene pentamine, (VII) polyisobutenyl N,N-dimethyl-1,3-diaminopropane, (VIII) polyisobutenyl tetrapropylene pentamine, (IX) polyisobutenyl dipropylene triamine, (X) polyethylene polybutene tetraethylene pentamine. The polyolefins in Examples II–X have a molecular weight between 1200 and 10,000.

The lubricant additives according to the invention are excellent dispersants which impart very satisfactory properties to the lubricants in which they are contained. This lubricant may be a mineral lubricating oil of various viscosities, but also a synthetic lubricating oil or a lubrication oil containing fatty oil. The additive may be added to the lubricant as such or as a concentrate, obtained, for instance, by mixing the product with a small quantity of the oil. The concentration of the additive in the oil may vary within wide limits. In general the desired detergents action is already brought about if the quantity added is between 0.1 and 10% wt., but in special cases quantities larger than those mentioned may be added, for instance, if the lubricating oil is applied in diesel engines that are apt to become badly fouled.

The additive containing 2.5% wt. nitrogen and 0.23% wt. chlorine (Example I) was tested in a Gardner single-cylinder diesel engine and in a Petter single-cylinder gasoline engine. The concentration of the additive in the finished lubricating-oil solution was 1.5% wt.; the base oil was a solvent-refined paraffinic lubricating-oil distillate. The viscosity of the base oil was 7.2 cs. at 98.9° C. in the Petter test, and 11.5 cs. at 98.0° C. in the Gardner test.

*Gardner diesel engine*

Water-cooled one-cylinder four-stroke engine, bore 108 mm., stroke 152.4 mm., piston displacement 1.4 liters, power output 11 H.P. at 1200 revolutions per minute. The duration of the test was 17 hours. The fuel was a gas oil having a sulfur content of 0.9% wt. The temperature of the cooling water was 80° C. In this engine the piston fouling was rated.

*Petter gasoline engine*

Water-cooled one-cylinder four-stroke engine, bore 85 mm., stroke 82.5 mm., piston displacement 468 ml., compression ratio 10.0:1, power output 3.5 H.P. at 1500 r.p.m. The duration of the test was 48 hours. The fuel was a motor gasoline with 0.32 ml. TEL (61.48% wt. tetraethyl lead, 18.81% wt. dichloroethane, 17.86% wt. dibromoethane, balance: coloring matter and kerosine) per liter and a sulfur content of 0.05% wt. The temperature of the cylinder cooling water was 80° C., that of the cooling water of the cooled timing gear cover 24° C. In this test, the degree of piston fouling and of sludge formation were rated.

The results of the engine tests are recorded in the table below, which also includes the results obtained with the base oil without additive.

|  | Gardner Diesel Piston Cleanliness (10=Clean) | Petter Gasoline Engine | |
|---|---|---|---|
|  |  | Sludge Formation | Piston Cleanliness |
|  |  | (10=Clean) | |
| Base oil+1.5% w. additive of Example I | 9.3 | 7.5 | 8.3 |
| Base oil | 4.4 | 5.1 | 5.9 |

Substitution of Examples II–V in concentration of 1–2% for additive of Example I in oil composition tested above give about the same results as the tested composition containing Example I additive in the above engine tests.

When applied as lubricant additives the compounds may be combined with other additives, such as anti-oxidants, detergent additives, viscosity-index improvers, anti-corrosive, anti-foaming agents, agents to improve the lubricating effect, and other substances that are generally added to lubricants.

I claim as my invention:

1. A lubricating oil composition comprising a major amount of lubricating oil and a minor amount, sufficient to impart detergency of an oil-soluble polyolefin-substituted polyalkylene polyamine having the structural formula

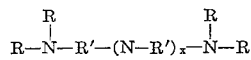

where R is selected from the group consisting of hydrogen and polyolefin having a molecular weight of from about 700 to about 100,000, at least one R being polyolefin, R' is an alkylene radical having from 1 to 8 carbon atoms and $x$ is 0–5.

2. A mineral lubricating oil composition comprising a major amount of mineral lubricating oil and from about 0.1% to about 10% of an oil-soluble N-polyisobutenyl substituted polyethylene polyamine having the structural formula

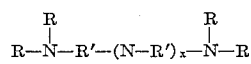

where R is selected from the group consisting of hydrogen and polyisobutenyl having a molecular of from about 1200 to about 50,000, at least one R being polyisobutenyl; R' is ethylene and $x$ is 0–5.

3. A mineral lubricating oil composition comprising a major amount of mineral lubricating oil and from about 0.1% to about 10% of an oil-soluble N-polyisobutenyl substituted tetraethylene pentamine, said polyisobutenyl substituent having a molecular weight of from about 1200 to about 50,000.

4. An oil-soluble polyolefin-substituted polyalkylene polyamine having the structural formula

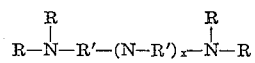

where R is selected from the group consisting of hydrogen and polyolefin having a molecular weight of from about 700 to about 100,000, at least one R being polyolefin, R' is an alkylene radical having from 1 to 8 carbon atoms and $x$ is 0–5.

5. An oil-soluble N-polyisobutenyl substituted polyethylene polyamine having the structural formula

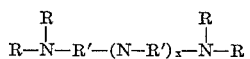

where R is selected from the group consisting of hydrogen and polyisobutenyl having a molecular weight of from about 1200 to about 50,000, at least one R being polyisobutenyl; R' is ethylene and $x$ is 0–5.

6. An oil-soluble N-polyisobutenyl substituted tetraethylene pentamine, said polyisobutenyl substituent having a molecular weight of from about 1200 to about 50,000.

References Cited by the Examiner

UNITED STATES PATENTS

| | | | |
|---|---|---|---|
| 2,267,205 | 12/1941 | Kyrides | 260—583 X |
| 2,898,295 | 8/1959 | MacKenzie | 252—50 X |
| 3,008,993 | 11/1961 | Lesslie et al. | 260—583 |
| 3,018,247 | 1/1962 | Anderson et al. | 252—32.7 |

DANIEL E. WYMAN, *Primary Examiner.*

P. P. GARVIN, *Assistant Examiner.*

Notice of Adverse Decision in Interference

In Interference No. 95,947 involving Patent No. 3,275,554, A. H. Wagenaar, POLYOLEFIN SUBSTITUTED POLYAMINES AND LUBRICANTS CONTAINING THEM, final judgment adverse to the patentee was rendered July 31, 1969, as to claims 1 to 6.

[*Official Gazette January 13, 1970.*]